United States Patent
Metelski

(10) Patent No.: US 6,997,425 B2
(45) Date of Patent: Feb. 14, 2006

(54) STAND, IN PARTICULAR FOR A SURGICAL MICROSCOPE

(75) Inventor: Andrzej Metelski, Romanshorn (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/107,548

(22) Filed: Mar. 27, 2002

(65) Prior Publication Data

US 2002/0185583 A1 Dec. 12, 2002

(30) Foreign Application Priority Data

Mar. 31, 2001 (DE) ................................. 101 23 166

(51) Int. Cl.
*F16M 1/00* (2006.01)
*A47F 5/02* (2006.01)

(52) U.S. Cl. ..................................... 248/676; 248/131

(58) Field of Classification Search ................ 248/676, 248/125.2, 125.7, 123.2, 124.2, 125.9, 154, 248/406.1, 405, 414, 183.2, 183.1, 288.51, 248/384.4, 384.5, 229.25, 637, 131, 677

See application file for complete search history.

(56) References Cited

U.S. PATENT DOCUMENTS

| | | | | | |
|---|---|---|---|---|---|
| 2,469,904 | A | * | 5/1949 | Szuba ...................... | 248/124.2 |
| 2,560,001 | A | * | 7/1951 | Scholfield et al. ........ | 248/125.7 |
| 2,898,068 | A | * | 8/1959 | Warren .................... | 248/183.1 |
| 2,970,798 | A | * | 2/1961 | Fritchle et al. ......... | 248/229.25 |
| 3,044,740 | A | * | 7/1962 | Pearce et al. ............ | 248/124.2 |
| 3,167,292 | A | * | 1/1965 | Meyerowitz ............. | 248/230.1 |
| 3,672,620 | A | * | 6/1972 | Fink ........................ | 248/125.1 |
| 4,284,257 | A | * | 8/1981 | Murkens .................. | 248/125.9 |
| 4,473,074 | A | * | 9/1984 | Vassiliadis ................... | 606/19 |
| 5,118,058 | A | * | 6/1992 | Richter .................... | 248/183.2 |
| 5,996,946 | A | * | 12/1999 | Bailey ...................... | 248/125.1 |
| 6,334,594 | B1 | * | 1/2002 | Bailey ...................... | 248/125.1 |
| 6,364,268 | B1 | | 4/2002 | Metelski | |
| 2002/0185583 | A1 | * | 12/2002 | Metelski ..................... | 248/676 |

* cited by examiner

*Primary Examiner*—Anita King
*Assistant Examiner*—Tan Le
(74) *Attorney, Agent, or Firm*—Hodgson Russ LLP

(57) ABSTRACT

The invention concern a stand, in particular for a surgical microscope, in which provision can be made, by means of adjustment devices on the stand itself and not on the stand foot (2), for the pivot axis (30) of the carrier arm (11) to be plumb.

27 Claims, 12 Drawing Sheets

STAND, IN PARTICULAR FOR A SURGICAL MICROSCOPE

CROSS REFERENCE TO RELATED APPLICATIONS

This application claims priority of the German patent application 101 23 166.0 filed Mar. 30, 2001 which is incorporated by reference herein.

FIELD OF THE INVENTION

The invention concerns a stand, in particular for a surgical microscope. The purpose of such stands is to hold a relatively heavy microscope so that it is movable by an operator with a minimum of resistance. An effort is therefore made to configure all joints, bearings, and the like in as low-resistance a fashion as possible, so that as little resistance as possible is presented to any arbitrary movement by the user.

BACKGROUND OF THE INVENTION

The result of a greater smoothness of operation in stands is that, in event of irregularities in the installation location (uneven floor) but also in the event of changes in the loads on the stand, moments of force or torques can occur that cause portions of the stand, in particular the stand arm, to move in drifting fashion in the unbraked state. "Drift" is understood to mean lateral pivoting motions (about a rotation axis), or tendencies toward such pivoting motions of the carrier arm, that are undesired by the user.

Three different actions for the reduction of drift are known from the existing art:

1. Alignment of the stand foot. At least three of, for example, four support feet of the stand foot are made adjustable as to height, and a bubble level on the stand foot indicates its horizontal alignment. A device of this kind is implemented, for example, on the FM2 of the Mitaka company. It ensures a precise adjustment capability, but entails the following disadvantages: Because a three-point adjustment is involved, a displacement at one of the three points creates a need for readjustment at the other two adjustment points. Inexperienced persons have a great deal of difficulty making the adjustment in quick and effective fashion.

There are further disadvantages as well:

Firstly, the adjustment to the stand foot is made while stooped over near the floor.

Secondly, a new adjustment must be made after each change of location, and possibly even after each load change on the stand arm, and usually on all three adjustment devices (or all the adjustment devices that are present).

Thirdly, the installation of the adjustment devices forces the operating person to work, when making the adjustments, in the vicinity of the floor, i.e. in a region that is remote from the patient in an operating room and has a lower degree of sterility.

In addition, an extra assistant might be needed in order to make the adjustments, whereas it would be desirable if an adjustment could be made by the surgeon or an operating room nurse him- or herself.

2. The second known variant comprises a brake to increase the rotational friction. With such a brake, the advantage of smooth operation is deliberately abandoned in order to reduce drift. For the user, this disadvantageously results in an increased need for force when moving the carrier arm. For the surgeon, a high level of exertion makes it difficult subsequently to wield a scalpel, or to do other work that requires a steady hand.

3. The third variant has hitherto been disclosed only in the context of ceiling mounts, and has nothing to do with the actual problem of changes in drift characteristics due to an uneven floor or the like, since in the case of a ceiling mount a fixed attachment point is usually provided from the outset, and no change takes place in the location on the ceiling. When the fixed installation point is created, it is of course optimally laid out so that a ceiling mount in principle has no drift. The adjustment in this context corresponds approximately to the leveling of a stand foot on the floor, although no further change in position is made after this adjustment. On the other hand, the loading of a ceiling mount, possibly with differing weights, creates another risk that in turn can generate drift:

Because of the limited stiffness of a conventional horizontal stand arm that is attached to a vertical support, when a further stand arm attached to that horizontal carrier arm is bent about a vertical pivot axis, the weight of the further carrier arm and of the microscope attached to it results in a torsion on the first carrier arm. Conversely, a flexural load on the stand arm results when the stand arm is extended. The purpose and solution in the case of the ceiling mount was to attain a state in which the microscope lies at the same height when the stand arm is both in the bent position and in the extended position. Once this adjustment has been made, in principle it remains unchanged. A change in the position of one of the stand arms does not change the behavior. Changes in location on the ceiling do not occur.

More detailed examinations of known stand assemblages, for example that of the Dräger series (the Dräger company in Germany has brought to market, under the product designation "Movita," a series of ceiling mounts that are used in intensive medicine and intensive care) or that of the Kreuzer company in Germany, offer no way toward a solution, since with these ceiling mounts, pivoting movability for surgical microscopes with magnifying properties is not paramount.

Greater frictional forces in rotary bearings do, however, keep them from running out of position, so that in known intensive-medicine ceiling mounts, the problem just mentioned does not even occur. What is required specifically in the case of microscope stands, however, is that the device not drift when the brakes are open, but can be moved with particular smoothness. There exist, for example, mouth switches with which the surgeon can, using his or her lips, on the one hand release the brakes and on the other hand reposition the brakes.

In the aforementioned previously published Patent Application EP-A-1067419, FIGS. 5–7 and the relevant portions of the specification disclose a known mechanism of this kind for preventing drift in ceiling mounts. This known drift prevention device acts, if required, in only one plane. Since the one-time, completely leveled attachment point on the ceiling means that lateral irregularities do not occur, there was hitherto also no need to provide further leveling features or drift compensation features on a ceiling mount. In this respect, this teaching known per se also offers those skilled in the art absolutely no stimulus to ensure that an improvement is created in floor stands with regard to the problem mentioned initially, namely that changes in the inclination of the stand foot usually occur after a change in the location of floor stands.

SUMMARY OF THE INVENTION

It is thus the object of the invention to discover an optimum adjustability for drift prevention on a stand, without impairing the smooth operation of the stand. In a further step, the intention is to discover a capability for performing drift compensation adjustment more quickly and easily than heretofore, and with no need for stooping.

The basic idea in this context is to bring into plumb the axis about which the horizontal carrier arm would drift due to gravity if the assembly were not aligned.

The object is achieved by application of the features of the present invention, in which at least one vertical rotation axis or at least one vertical rotary bearing of the stand can be brought, displaceably in at least two planes, into a perpendicular position with respect to the stand foot irrespective of the position of the upright column.

A "stand foot" is to be understood as all those apparatuses which support a stand with respect to the floor. These may be conventional stand feet but also carriages, trolleys, or the like. "Upright columns" are to be understood not just as conventional vertical columns on a stand foot, but also as carrier arms or the like that are movable on rails, trolleys, or the like.

Further embodiments and developments of the invention are recited in the dependent claims and in the description of the Figures.

BRIEF DESCRIPTION OF THE DRAWINGS

The invention is explained in more detail, by way of example, with reference to sketches.

The Figures are described in overlapping fashion; identical reference characters denote identical components; reference characters having the same numbers but different indices denote slightly different components having the same purpose or similar effects.

DETAILED DESCRIPTION OF THE INVENTION

Figure 1:
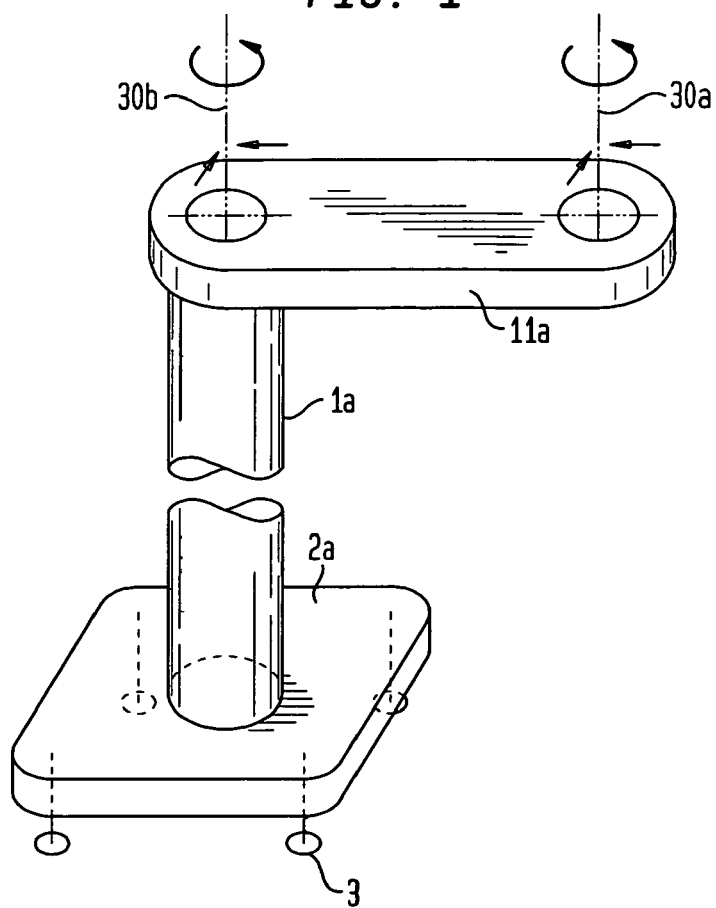
FIG. 1 shows a simple stand assemblage with a stand foot and vertical column and pivoting arm.
Figure 2:
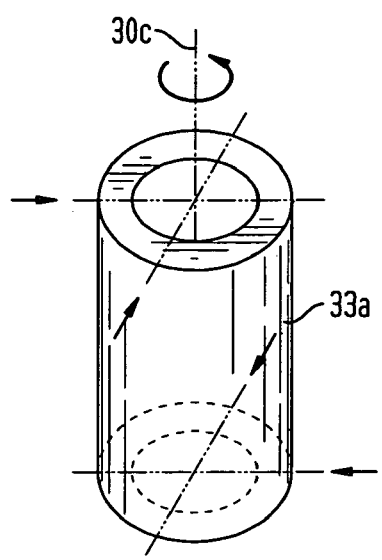
FIG. 2 symbolically shows an adjustable vertical rotary bearing.

As is evident from FIG. 1 what are involved are fundamentally vertical axes 30a, b that can be arranged on the one hand directly on upright column 1a, but on the other hand also on a carrier arm of stand 11a (as depicted e.g. in FIG. 3) or, as is evident from FIG. 2, about a rotary bearing 33a that receives or defines such a pivot axis 30c. The purpose of the invention in the context of the adjustment of axes 30 or pivot bearing 33 is to bring the latter into plumb by way of manual or motor-controlled adjustment operations.

Figure 3:
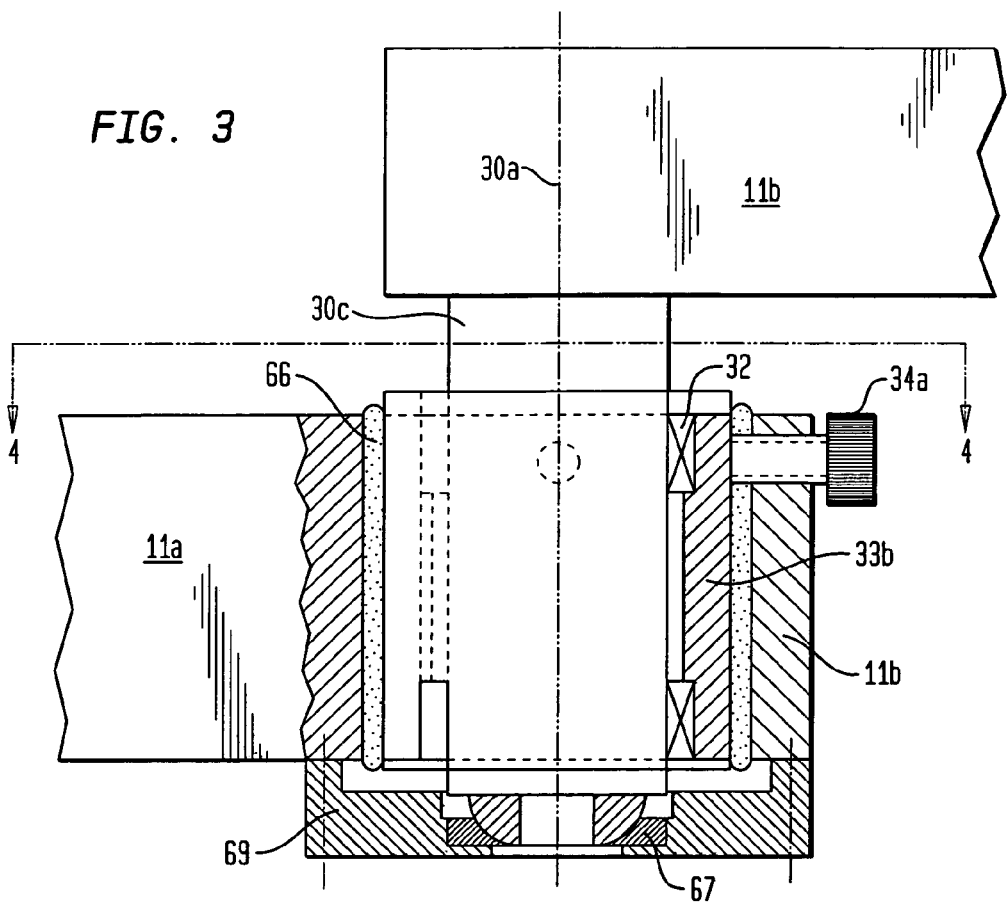
FIG. 3 shows an adjustable rotary bearing of this kind in a horizontal carrier arm (in section)

FIG. 3 symbolically shows the construction of a displacement device in which, by means of a displacement screw 34a, bearing tube 33b can be pushed against an elastic intermediate layer 66 because bearing tube 33b is held movably in a rotary pivot bearing 67. Instead of a direct installation on an upright column, carrier arm 11b is supported on another carrier arm 11a that is held movably on an upright column or also, for example, in a wall rail mount. Since the problem of a change in drift behavior that is to be solved according to the invention occurs only when the physical placement point is changed with respect to the floor, in which context rotation axes can get out of plumb, ceiling mounts are excluded from consideration. On the other hand, for purposes of the invention a carrier arm 11a at least with its rotary pivot bearing 67 is to be understood as an upright column. On the other hand, a rotary pivot bearing 67 of this kind could also be incorporated directly into an upright column.

Figure 4:
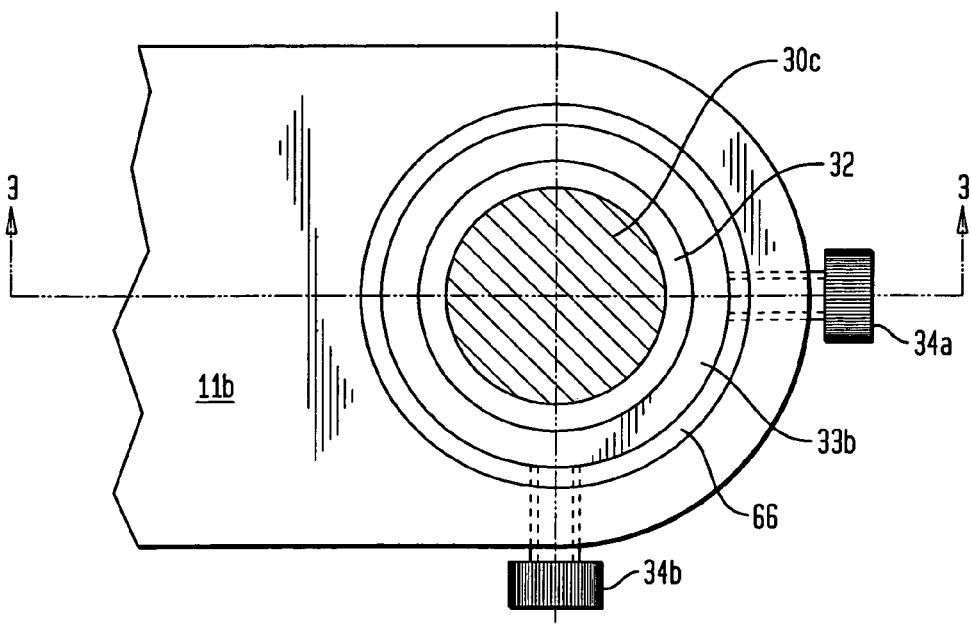
FIG. 4 is a plan view of the assemblage shown in FIG. 3, partially in section.

It is evident from FIG. 4 that two or more displacement screws 34 can move bearing tube 33b within the elastic intermediate layer 66.

Figure 4A:
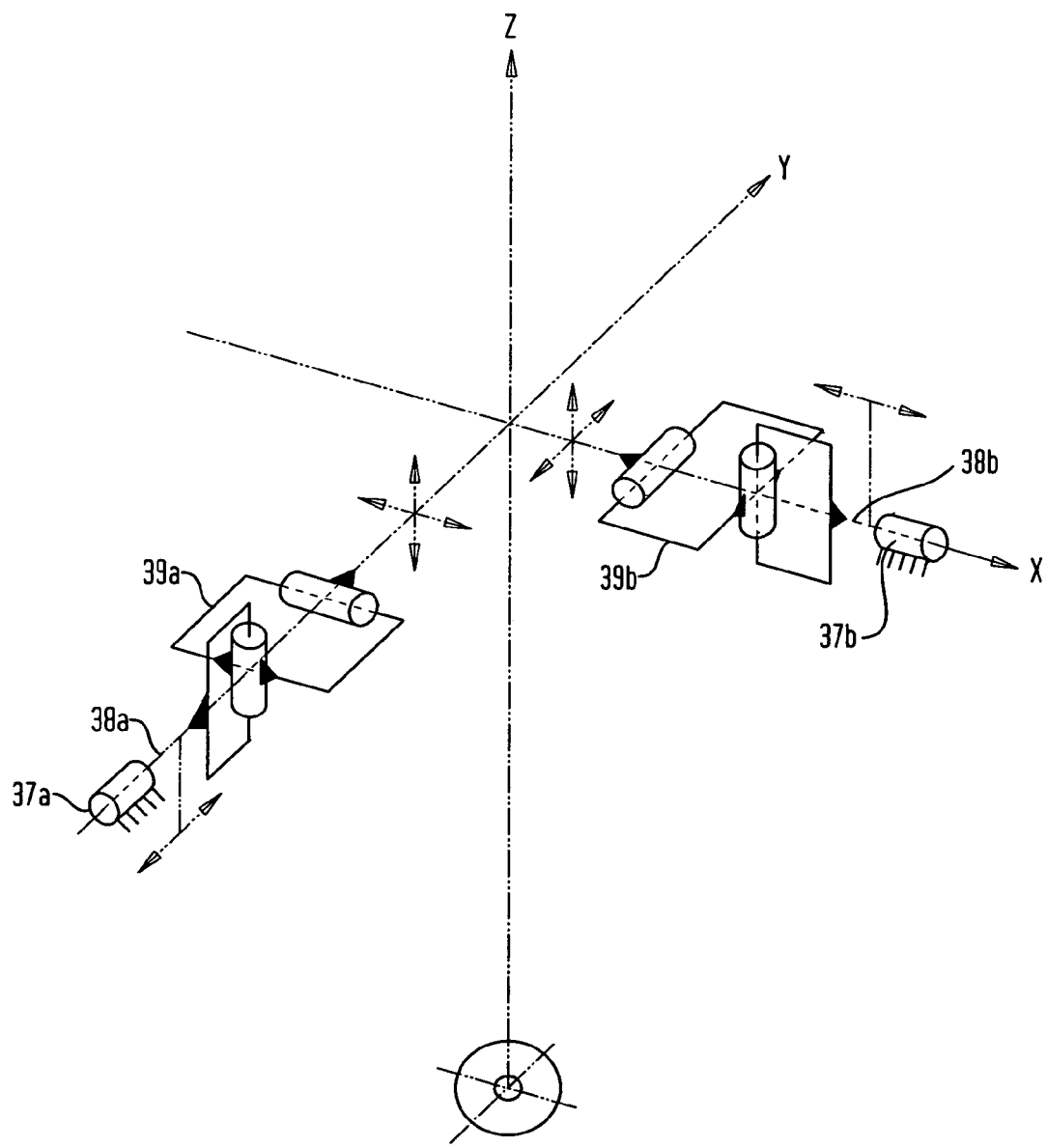
FIG. 4a shows a stand assemblage with spindles and X/Z and Y/Z carriages.

FIG. 4a symbolically shows the construction of a displacement apparatus that makes do with two spindles 38a and 38b that are arranged (e.g. in a vertical tube) each within an axially immovably mounted nut 37a and 37b respectively. Both a pushing motion (as in FIGS. 3 and 4 with displacement screw 34) and a pulling motion are thereby enabled. An X/Z carriage 39a and a Y/Z carriage 39b are provided to compensate for relative motions. When an adjustment is made on one side, these carriages 39a, b prevent the other side from also being influenced, since the carriage bearings tolerate a pivot motion of the Z axis that is stimulated from one side.

Figure 5:
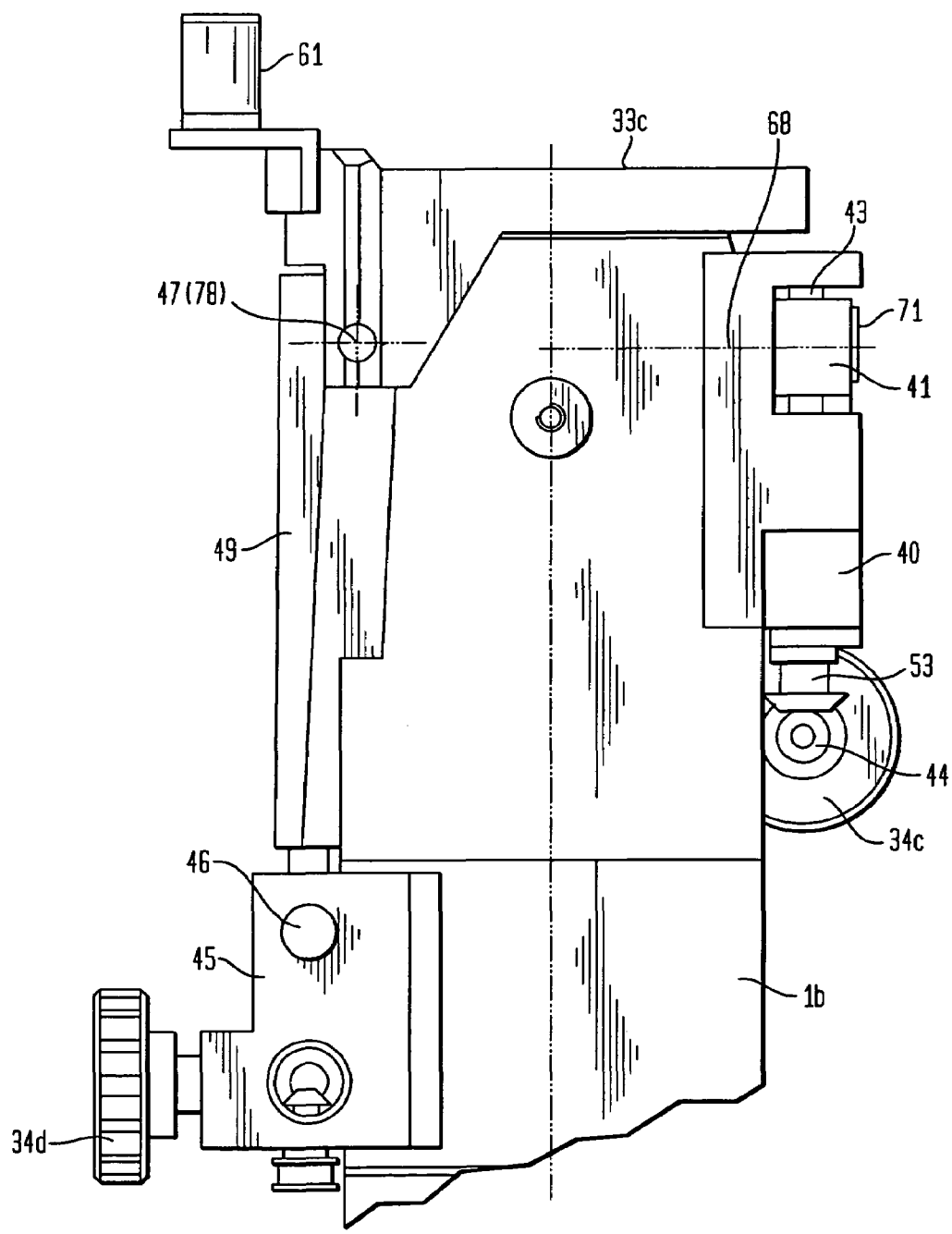
FIG. 5 shows a variant of a pivotable rotary bearing on an upright column in side view.
Figure 13:
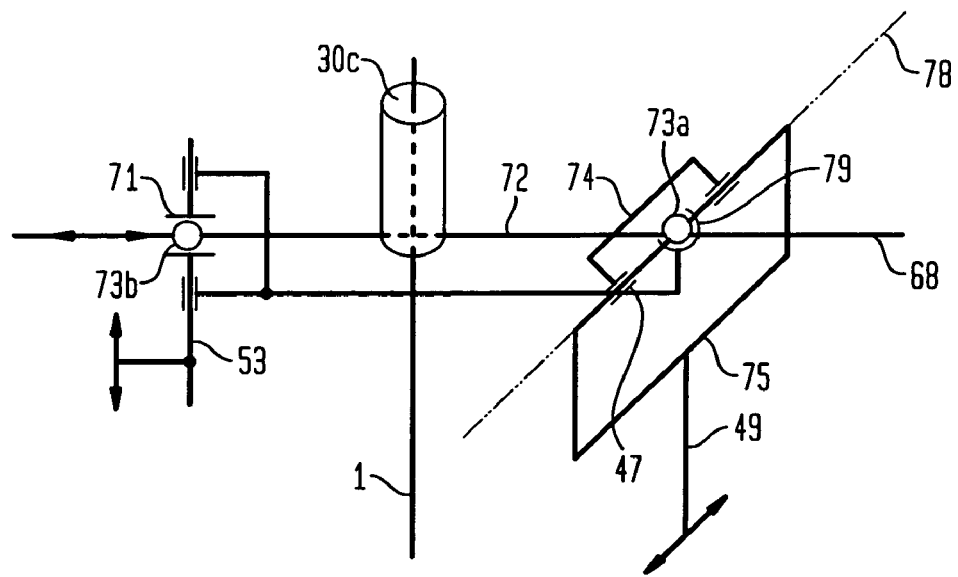
FIG. 13 shows the assemblage according to the present invention as a schematic wire model.
Figure 14:
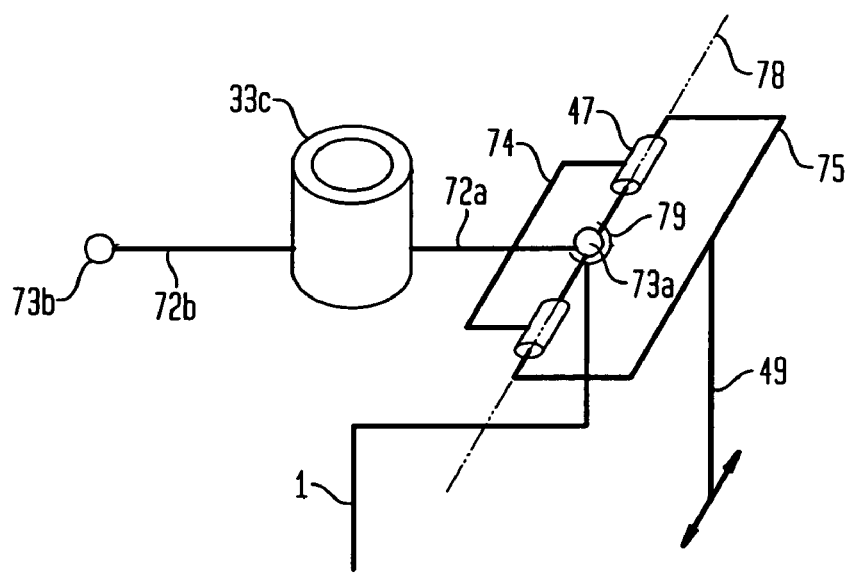
FIG. 14 shows a detail of the wire model.

FIG. 5 shows a variant embodiment of a rotary pivot bearing in which, with the aid of two displacement screws 34c and 34d, a bearing sleeve 33c can be aligned in such a way that measurement sensor 61 (circular bubble level) indicates that bearing sleeve 33c is perpendicular. The measurement sensor is rigidly joined to bearing sleeve 33c. The latter is pivotable about an axis 78 and about an axis 68. The principle of this pivotability is depicted in FIGS. 13 and 14:

A spherical bearing 79 forms the central articulation point for a shaft 72 that carries pivot bearing 33c in upright column 1. Bearing 79 is held or configured on upright column 1, and receives a ball 73a that is rigidly joined to shaft 72. Simultaneously rigidly joined to said shaft is a yoke 74 that supports a pivoting yoke 75 at both ends. Pivoting yoke 75 is joined to a pivoting tongue 49. A deflection of pivoting tongue 49 results in a pivoting of shaft 72 about its own axis 68 or about ball 73a. As is evident from FIG. 14, in the embodied example bearing sleeve 33c is held by means of stub shafts 72a and 72b, which replace shaft 72. It is also evident from FIG. 14 that a pivoting of the pivoting tongue also pivots bearing sleeve 33c.

In order to make this bearing sleeve 33c also pivotable in a transverse direction, the end of shaft 72 is also held, for example by way of a ball 73b, in a plain bearing 71 in which it can both pivot back and forth in the axial direction and rotate about its axis 68. By means of threaded spindle 53, plain bearing 71 is displaceable in its height position relative to upright column 1. In this displacement, shaft 72 pivots in spherical bearing 79 without influencing pivoting yoke 75.

The pivoting motion about the two axes 68 and 78 is generated, in the preferred embodiment model as shown in FIG. 5, by turning displacement screws 34c and 34d, which by way of conventional bevel gear drives or the like act on the one hand on pivoting tongue 49 and on the other hand on threaded spindle 53.

Figure 6:
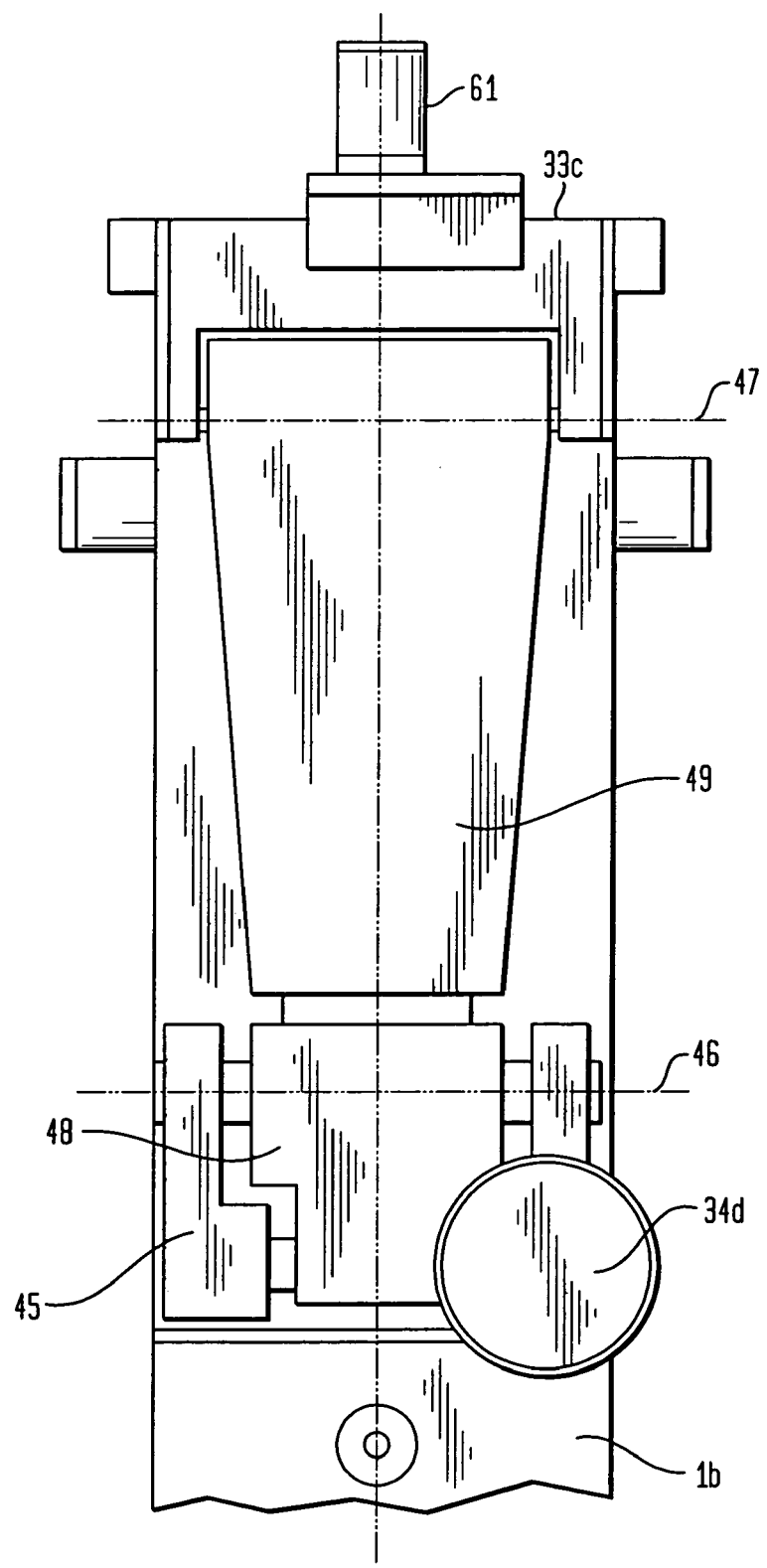
FIG. 6 shows the variant according to FIG. 5 from a front view.

FIG. 6 shows the same variant embodiment from a different perspective, making visible a sliding member 48 that is laterally displaced by rotation of screw 34d and entrains pivoting tongue 49 that is mounted so as to slide up and down in sliding member 48. Sliding member 48 is displaceable along a slide shaft 46 that is held in a holding block 45 secured to the upright column shaft.

Figure 7:
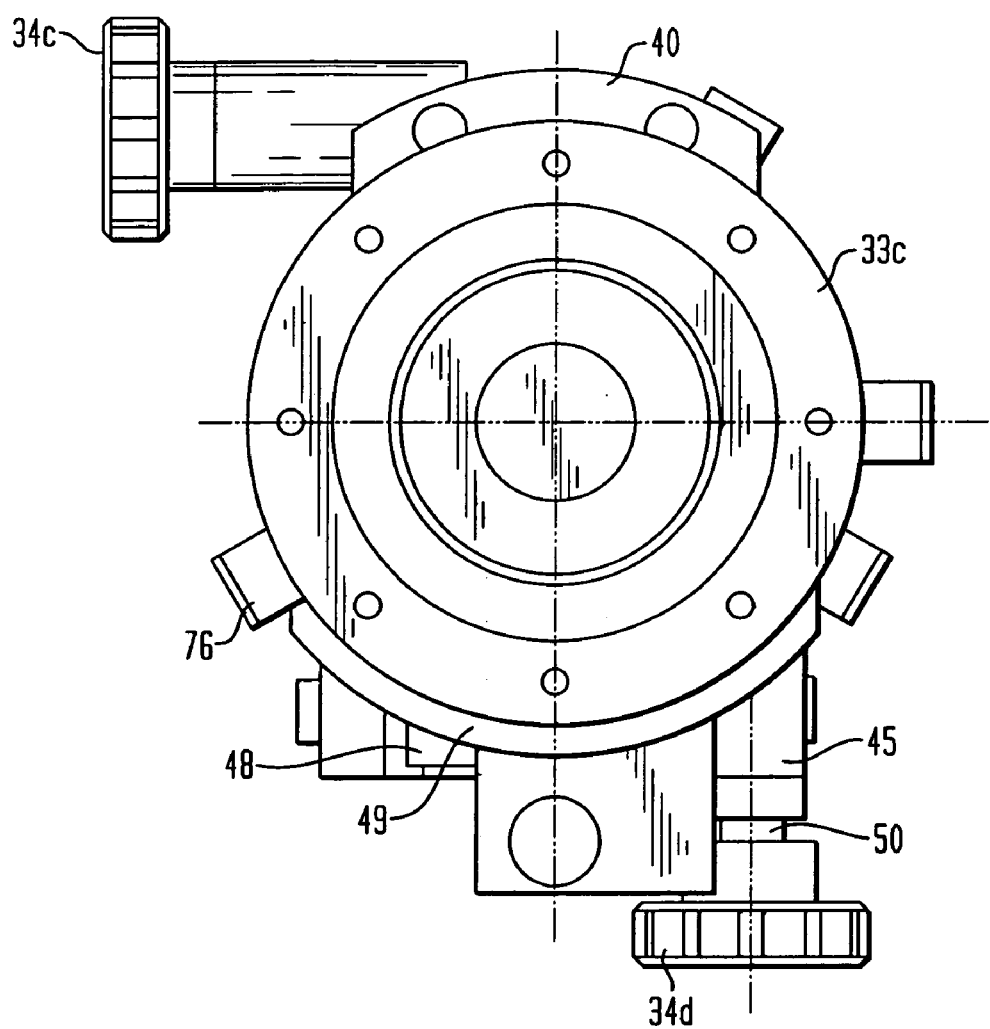
FIG. 7 shows the variant from FIG. 5 in a plan view.

FIG. 7 shows a plan view thereof.

Figure 8:
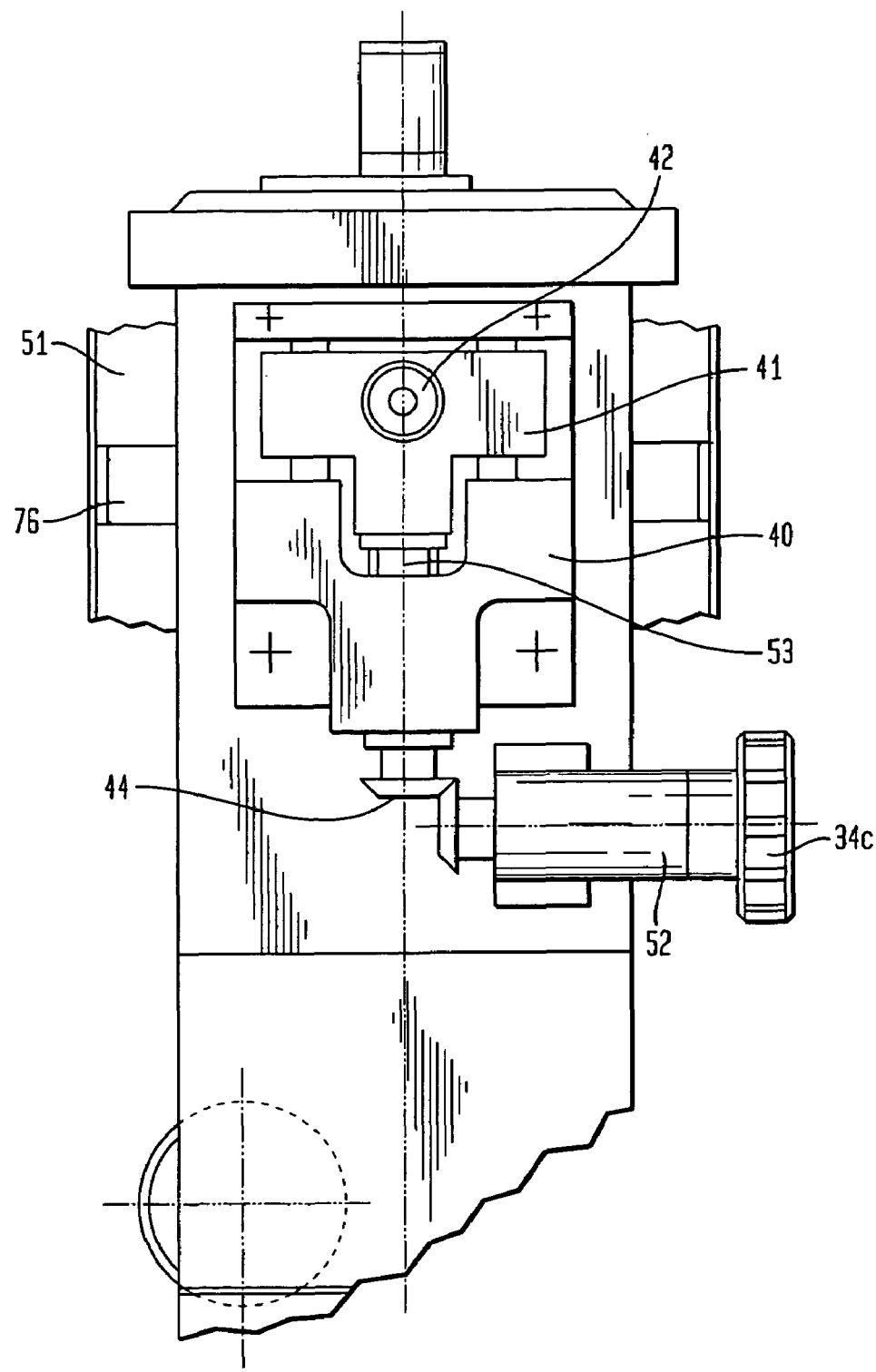
FIG. 8 shows the assemblage according to FIG. 5 with some components removed in side view.

In FIG. 8, the same variant embodiment is depicted with some components removed. It is evident in this depiction that displacement screw 34c drives a threaded spindle 53 by means of a bevel gear drive 44. The vertical portion of bevel gear drive 44 drives spindle 53, which modifies the height of slider 41 and thereby causes a deflection of bearing sleeve 33c about axis 78. Spindle 53 is mounted in a guide block 40, and could also be driven directly by a motor.

Also visible is a portion of cover 51, which forms the exterior of the upright column and can be attached to attachment pegs 76.

Figure 9:
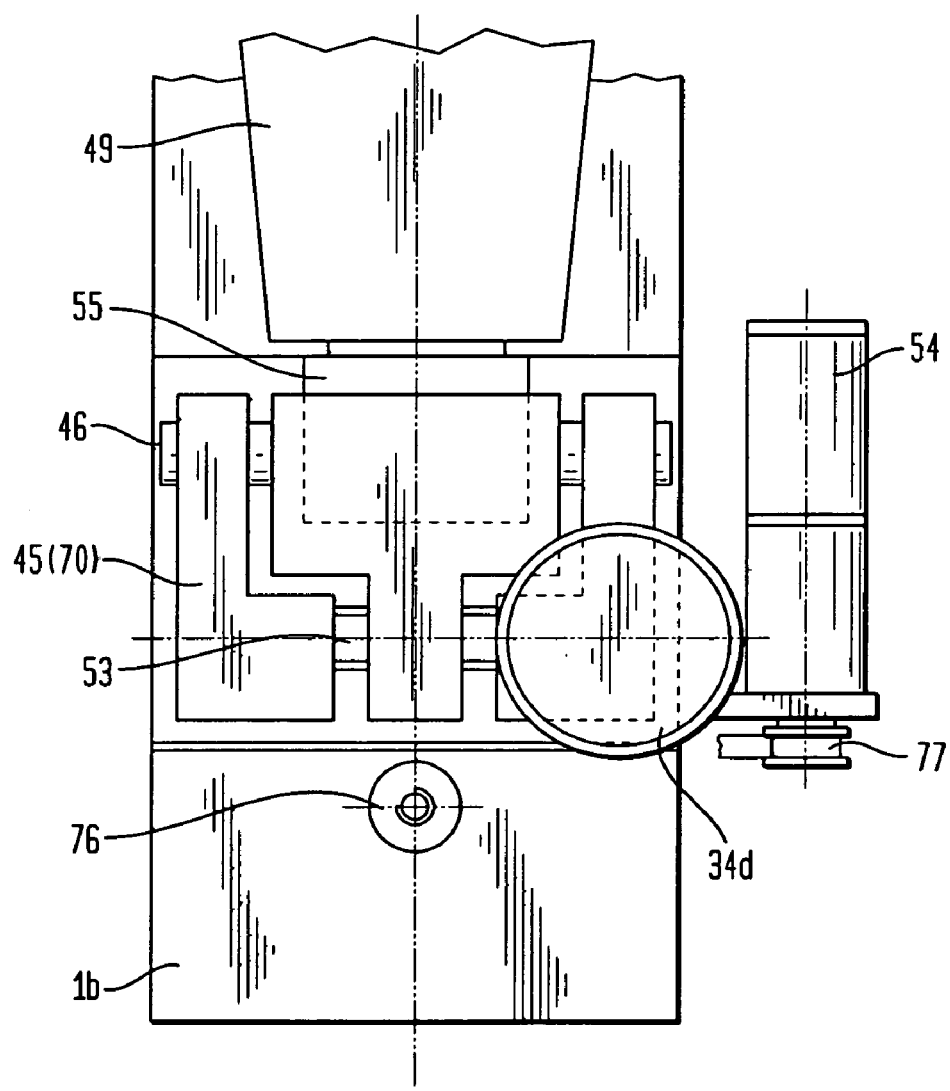
FIG. 9 shows the assemblage according to FIG. 5 in a front view, with an electric drive for drift adjustment.
Figure 10:
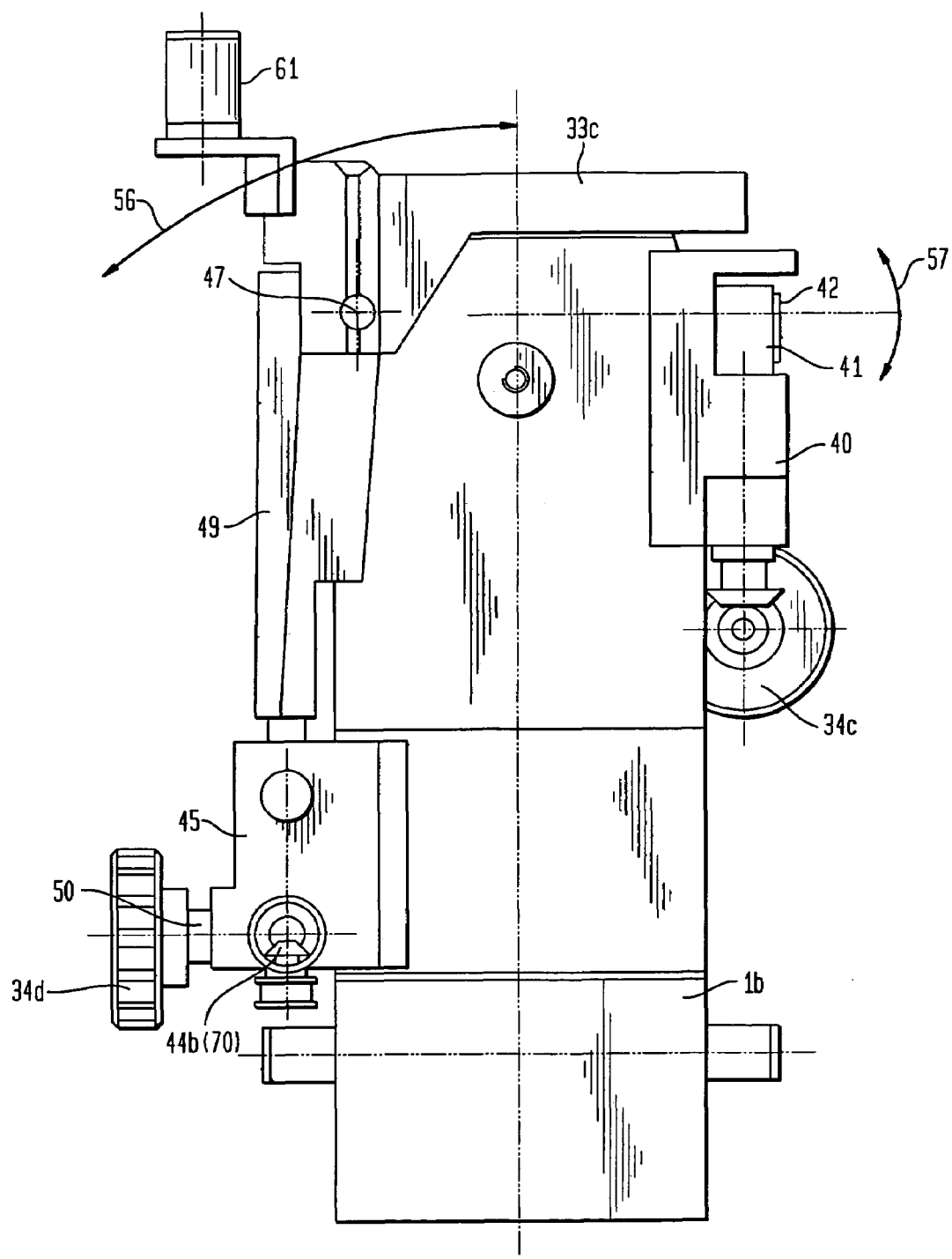
FIG. 10 shows the assemblage according to FIG. 9 in a side view, with the motor removed.

FIGS. 9 and 10 show the assemblage according to FIG. 5 with positioning motor 54 installed and removed. A comparable bevel gear drive 44b drives a spindle 53b which pivots slider 48 about its axis 68. The motor has in its lower region a toothed-belt pinion over which a toothed belt can be looped in order to create the connection (not depicted in further detail) to the displacement linkage in bearing block 45. Since the details of this assemblage are common knowledge to those skilled in the art, and any number of variants are conceivable, explanation in any further detail is superfluous.

A simultaneous displacement of the two spindles 53 or shafts 50 thus results in a deflection of bearing sleeve 33c obliquely with respect to axes 78 and 68. The pivoting about each of axes 78 and 68 may be made independently, and does not influence the other respective pivot position. In contrast to other similar level adjustment apparatuses, the displaceability is thus implemented in a manner comparable to a simple X-Y carriage but in pivoting fashion, which thus greatly simplifies operability even for inexperienced persons. This assemblage is further simplified by the replacement of the manually operated displacement screws 34c and 34d by electrical drives 54, which are as indicated by way of example in FIG. 9 but can also be differently constructed and arranged.

Figure 11:
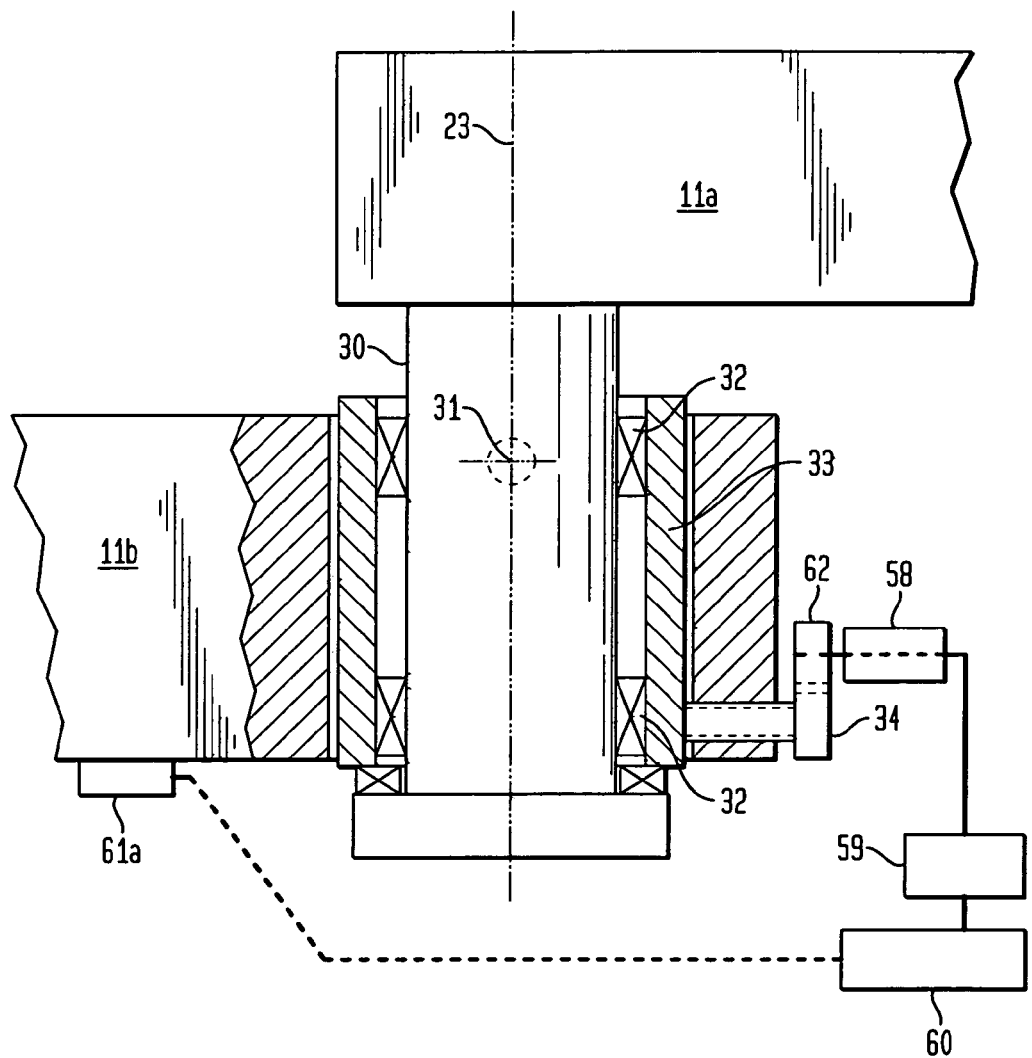
FIG. 11 shows a variant of the assemblage according to FIG. 3 with automatically adjustable drift compensation.

FIG. 11 once again shows the assemblage according to FIG. 3 in symbolic and simplified fashion, with no discussion of the pivot bearing; here the displacement of bearing tube 33 is accomplished automatically by means of drives 58 (merely indicated), by analysis of the data of angle sensor 61a or an electronic bubble level or electronic inclination sensor by computer 60, and corresponding instructions to controller 59.

Figure 12:
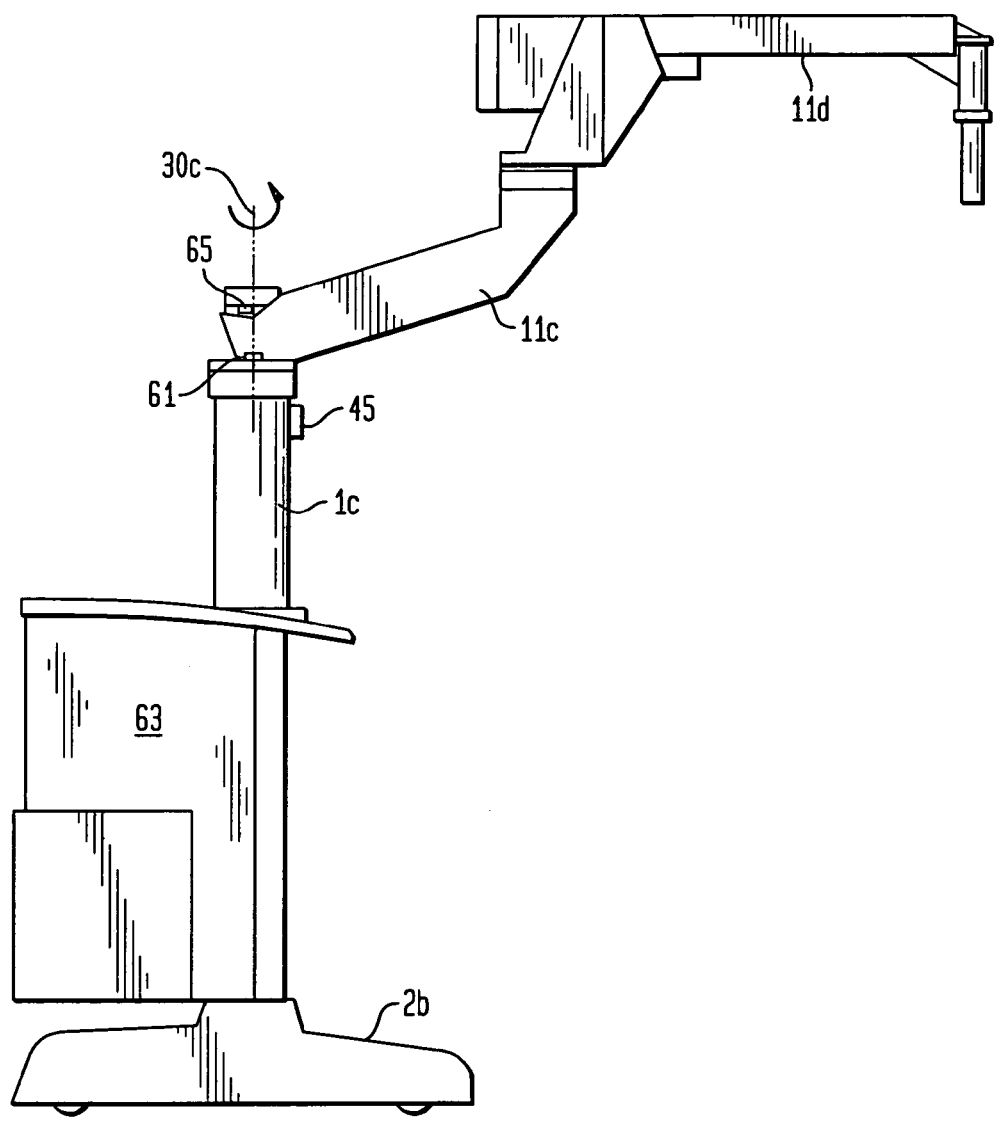
FIG. 12 shows an example of a stand according to the present invention in an overall view.

FIG. 12 shows an exemplary overall view of a stand according to the present invention with a stand foot 2b, an upright column 1c, and an equipment box 63 that because of its arrangement also serves to improve tipover resistance. The number 65 indicates a brake that, in the braked state, prevents the rotation of carrier arm 11c about vertical axis 30c. Carrier arm 11c carries a further stand arm such as that indicated in German Patent Application DE 200 19 107 corresponding to U.S. application Ser. No. 10/007168 filed Nov. 8, 2001, the details and technical embodiments recited therein in the Figures and associated Descriptions of the Figures are considered to be also disclosed herein by reference.

The Parts List which follows is a constituent of the Specification and supplements the Description of the Figures. The assemblages, apparatuses, and details recited in the claims are also considered to be disclosed in the context of the Specification.

The entirety of U.S. patent application Ser. No. 10/107,464 (claiming priority of German patent application 101 15 837.8 filed Mar. 31, 2001) filed on the same date as the present application and sharing the same applicant is incorporated herein by reference, since a possible further configuration of a stand according to the present invention is further described therein with other details. The teachings of the two patent applications can be combined with one another.

| PARTS LIST |
| --- |
| 1a, b, c Upright column |
| 2a, b Stand foot |
| 3 Nut |
| 4 Surgical microscope |
| 5 Auxiliary stand |
| 6 Computer |
| 7 Control system |
| 8 Energy source |
| 9 Carrier arm |
| 10 Compensation arm |
| 11a, b, c, d Carrier arm part |
| 12a, b Distal carrier arm part |
| 13 Ceiling bracket |
| 14 Support columns |
| 15 Support plate |
| 16 Immovable building part, ceiling |
| 17a, b, c Damping layer |
| 18a, b, c Non-damping layer |
| 19 Damping interface, damping element |
| 20 Glass fiber cable |
| 21 Equipment cabinet |
| 22 Bridge |
| 23 Vertical axis |
| 24 Bracket |
| 25 Display |
| 26 Operating elements |
| 27 Gas spring |
| 28 Adjustment means |
| 29 Pivoting part |
| 30a, b, c Support axis |
| 31 Gimbal suspension |
| 32 Bearing |
| 33a, b, c Bearing sleeve |
| 34a, b, c, d Displacement screw |
| 35 Bridge |
| 36 Damping peg |
| 37a, b Nut |
| 38a, b Spindle |
| 39a, b X/Z carriage |
| 39b Y/Z carriage |
| 40 Guide block |
| 41 Bearing block |
| 42 Bearing |

-continued

PARTS LIST

| | |
|---|---|
| 43 | Guide rod |
| 44 | Bevel gear drive |
| 45 | Holding block |
| 46 | Slide shaft |
| 47 | Pivot axis |
| 48 | Sliding member |
| 49 | Pivoting tongue |
| 50 | Shaft |
| 51 | Cover shell |
| 52 | Shaft guide |
| 53 | Threaded spindle |
| 54 | Positioning motor |
| 55 | Entraining part |
| 56 | Arrow |
| 57 | Arrow |
| 58 | Motor |
| 59 | Controller |
| 60 | Computer |
| 61 | Measurement sensor |
| 62 | Linkage |
| 63 | Equipment box |
| 64 | Handle |
| 65 | Brake |
| 66 | Elastic intermediate layer |
| 67 | Rotary pivot bearing |
| 68 | Axis |
| 69 | Housing |
| 70 | Linkage |
| 71 | Plain bearing |
| 72 | Shaft |
| 73a, b | Ball |
| 74 | Yoke |
| 75 | Pivoting yoke |
| 76 | Attachment peg |
| 77 | Toothed-belt pinion |
| 78 | Axis |
| 79 | Spherical bearing |
| III, IV | Section planes |

What is claimed is:

1. A stand for supporting a surgical microscope, said stand comprising:
   a stand foot (2);
   an upright column (1) extending from said foot;
   a rotary bearing (33) connected to said column, said rotary bearing defining a pivot axis (30) and said rotary bearing being supported directly or indirectly with respect to said upright column (1) by means of an axial rotary pivot bearing (67);
   a carrier arm mounted in said rotary bearing for rotation about said pivot axis; and
   means for swiveling said pivot axis in at least two planes to fixedly adjust said pivot axis relative to said foot and to bring said pivot axis into plumb in each of the at least two planes;
   wherein said pivot axis is swiveled without swiveling said column.

2. The stand as defined in claim 1, wherein said at least two planes are perpendicular to one another.

3. The stand as defined in claim 1, wherein the pivot axis (30) extends through the upright column (1).

4. The stand as defined in claim 1, wherein said means for swiveling said pivot axis comprises a pair of positioning screws (34) arranged in a horizontal plane and offset angularly from one another by approximately 90°.

5. The stand as defined in claim 4, wherein the positioning screws are thread-mounted in the upright column and act directly on the rotary bearing (33).

6. The stand as defined in claim 1, wherein the pivot axis (33) is swiveled about a first swivel axis (68) and about a second swivel axis (78), and said means for swiveling said pivot axis includes positioning screws (34c, 34d) or motorized operating units (54, 58) placed apart from said first and second swivel axes (68, 78).

7. The stand as defined in claim 1, wherein the pivot axis is swiveled about a first swivel axis (68) defined at one end with a spherical locating bearing (79) on the upright column (1), and the pivot axis is swiveled about a second swivel axis (78) which proceeds virtually through the center point of the spherical locating bearing (79) and is mounted in or on the rotary bearing (33c).

8. The stand as defined in claim 7, wherein there is arranged, virtually through the center point of the spherical locating bearing (79) perpendicular to the first swivel axis (68), a guide rod (47) on which engages a pivoting lever (49) that is joined articulatedly to the rotary bearing (33c), the guide rod (47) preferably aligning axially with the second swivel axis (78).

9. The stand as defined in claim 1, wherein said means for swiveling said pivot axis includes threaded spindles (53) remotely operable in motorized fashion.

10. The stand as defined in claim 1, wherein said means for swiveling said pivot axis includes an inclination sensor (61) attached directly or indirectly to the rotary bearing (33c) and motorized operating units (54, 58) responsive to commands based on signal information from said inclination sensor, whereby automatic swiveling of said pivot axis is accomplished.

11. The stand as defined in claim 6, wherein a gear drive (44) is arranged at least between a positioning screw (34) or a motor (54) and the pivotable rotary bearing (33).

12. The stand as defined in claim 4, wherein the positioning screws (34) are remotely operable in motorized fashion.

13. The stand as defined in claim 1, wherein the upright column (1) is movable and adjustable and optionally controllable in its position relative to the stand foot (2).

14. The stand as defined in claim 1, wherein an elastic intermediate layer (66) is arranged between the rotary bearing (33b) and the carrier arm (11a).

15. A stand for supporting a surgical microscope, said stand comprising:
   a stand foot(2);
   an upright column (1) extending from said foot;
   a rotary bearing (33) connected to said column, said rotary bearing defining a pivot axis (30) and said rotary bearing being supported directly or indirectly with respect to said upright column (1) by means of an axial rotary pivot bearing (67);
   a carrier arm mounted in said rotary bearing for rotation about said pivot axis; and
   means for swiveling said pivot axis about a first swivel axis (68) passing through said pivot axis (30) or through said rotary bearing (33), and about a second swivel axis (78) spaced from said pivot axis (30) or from said rotary bearing (33) to fixedly bring said pivot axis into plumb in the first and second swivel axes;
   wherein said pivot axis is swiveled without swiveling said column.

16. The stand as defined in claim 15, wherein the pivot axis (30) extends through the upright column (1).

17. The stand as defined in claim 15, wherein said means for swiveling said pivot axis comprises a pair of positioning screws (34) arranged in a horizontal plane and offset angularly from one another by approximately 90°.

18. The stand as defined in claim 17, wherein the positioning screws are thread-mounted in the upright column and act directly on the rotary bearing (33).

19. The stand as defined in claim 15, wherein said means for swiveling said pivot axis includes positioning screws (34c, 34d) or motorized operating units (54, 58) placed apart from said first and second swivel axes (68, 78).

20. The stand as defined in claim 15, wherein said first swivel axis (68) is defined at one end with a spherical locating bearing (79) on the upright column (1), while said second swivel axis (78) proceeds virtually through the center point of the spherical locating bearing (79) and is mounted in or on the rotary bearing (33c).

21. The stand as defined in claim 20, wherein there is arranged, virtually through the center point of the spherical locating bearing (79) perpendicular to the first swivel axis (68), a guide rod (47) on which engages a pivoting lever (49) that is joined articulatedly to the rotary bearing (33c), the guide rod (47) preferably aligning axially with the second swivel axis (78).

22. The stand as defined in claim 15, wherein said means for swiveling said pivot axis includes threaded spindles (53) remotely operable in motorized fashion.

23. The stand as defined in claim 15, wherein said means for swiveling said pivot axis includes an inclination sensor (61) attached directly or indirectly to the rotary bearing (33c) and motorized operating units (54, 58) responsive to commands based on signal information from said inclination sensor, whereby automatic swiveling of said pivot axis is accomplished.

24. The stand as defined in claim 19, wherein a gear drive (44) is arranged at least between a positioning screw (34) or a motor (54) and the pivotable rotary bearing (33).

25. The stand as defined in claim 17, wherein the positioning screws (34) are remotely operable in motorized fashion.

26. The stand as defined in claim 15, wherein the upright column (1) is movable and adjustable and optionally controllable in its position relative to the stand foot (2).

27. The stand as defined in claim 15, wherein an elastic intermediate layer (66) is arranged between the rotary bearing (33b) and the carrier arm (11a).

* * * * *